United States Patent

Salz

[11] Patent Number: 5,836,642
[45] Date of Patent: Nov. 17, 1998

[54] VEHICLE ROOF WITH A SERIES OF RAISABLE COVER STRIPS

[75] Inventor: Wolfram Salz, Ditzingen-Hirschlanden, Germany

[73] Assignee: Webasto Karosseriesysteme GmbH, Stockdorf, Germany

[21] Appl. No.: 751,682

[22] Filed: Nov. 18, 1996

[30] Foreign Application Priority Data

Nov. 17, 1995 [DE] Germany .......................... 195 42 884.6

[51] Int. Cl.[6] .................................................. B60J 7/047
[52] U.S. Cl. ...................................... 296/216.02; 296/220
[58] Field of Search ................................... 296/216, 220, 296/223, 224

[56] References Cited

U.S. PATENT DOCUMENTS 5,335,961 8/1994 Reinsch et al. ...................... 296/220 X

FOREIGN PATENT DOCUMENTS

0309775 4/1989 European Pat. Off. ............... 296/220
43 29 580 C1 11/1994 Germany .

Primary Examiner—Dennis H. Pedder
Attorney, Agent, or Firm—Sixbey, Friedman, Leedom & Ferguson; David S. Safram

[57] ABSTRACT

Vehicle roof with cover strips for closing or exposing of a roof opening, the strips bordering one another in the closed position and forming a planar integrated system of strips, each cover strip having a respective pivoting attachment element which is guided along a guideway attached to the roof, adjacent attachment elements being coupled for joint movement in the opening and closing direction, as long as they are not fully swung out, and being decoupled as soon as one of the two has reached its fully swung-out position. In the decoupled state, the adjacent attachment elements engage one another so that they can be moved against one another while the not yet fully swung-out attachment element is being swung out. The rearmost cover strip engages a guide element, such that it can be moved relative to it along a fixed path. The guide element is attached securely to the roof and the adjustment path of the rearmost cover strip relative to the guide element is made such that this strip can be automatically displaced by an adjustment movement relative to the guide element fixed on the roof, between the closed position and a swung-out position.

18 Claims, 5 Drawing Sheets

VEHICLE ROOF WITH A SERIES OF RAISABLE COVER STRIPS

BACKGROUND OF THE INVENTION

The invention relates to a vehicle roof with a louver type series of cover strips for alternatively closing or at least partial exposing of a roof opening in a fixed roof surface, the strips bordering one another in the closed position and forming a planar integrated system of strips. In particular, to such a vehicle roof in which each strip has a pivoting attachment element on its narrow ends, the attachment elements being guided along a guideway attached to the roof, and in which two adjacent attachment elements at a time are coupled for joint movement in the opening and closing direction, so long as they are not fully swung out, and are decoupled as soon as one of the two attachment elements has reached its fully swung-out position and engage one another such that, in the decoupled state, they can be moved against one another while not yet fully swung-out attachment elements are being swung out. Still further, the invention relates to a vehicle roof with such attachment elements wherein an attachment element in the fully swung-out position can be locked under the influence of the opening movement of an adjacent attachment element via one locking element at a time, and the locking of a swung-out attachment element can be automatically released under the influence of the closing motion of the other adjacent attachment element, and the strip which forms a companion engaging a guide element such that it can be moved opposite it along a fixed path.

DESCRIPTION OF RELATED ART

A known louvered roof of this type (German Patent 43 29 580 and corresponding U.S. application Ser. No. 08/299, 090, now abandoned), in contrast to sliding or sliding and lifting roofs, enables clearance of relatively large roof openings with simultaneously high stability, reliable holding of the strips, and aerodynamically favorable behavior. Such a roof is relatively easy to adapt to different vehicle types.

In such a known roof, the strip which forms the front end of the integrated system of strips (with reference to the normal forward direction of vehicle travel) is driven via a front drive element or drive part. Opening of the louvered roof begins first with a swinging out of the strip which forms the rear end of the integrated system of strips (again, with reference to the normal forward direction of travel). On the front sides of this rear strip, a crank slot is formed which is engaged by a crank pin which is formed on a lifting crank. The crank pin is, in the closed position, at the back end of the crank slot. The lifting crank is coupled, on one end, via a hinge pin to a part attached to the roof, and on the other end, has a crank slot which is engaged by a crank lock. This crank lock is provided on a rear drive element which is joined to the front drive element via a linkage.

With the beginning of the opening movement, the front drive element, and thus also the rear drive element, are shifted rearward, so that the crank pin of the rear drive element is pushed rearward in the crank path of the lifting crank. The crank path is made such that the lifting crank is pivoted upward around the hinge pin, by which the crank pin of the lifting crank swings the rearmost strip of the integrated system of strips at the same time up and back. In this way, the rearmost strip detaches from the rear edge of the roof opening, so that this strip can be pushed to the rear in the course of further opening motion of the roof without colliding with parts attached to the roof.

One disadvantage in this known arrangement is that, for the lifting function of the rearmost strip, a host of mechanical parts are used; this leads to complex production and assembly, an increase in weight and to reduced operating reliability. In particular, the connecting rods which reach roughly the length of the roof between the front and rear drive element are complex and can lead to malfunctions due to thermal expansion effects on this length.

SUMMARY OF THE INVENTION

Consequently, primary objects of the present invention are to devise a louvered vehicle roof which operates as reliably as possible, which has as small a number of mechanical parts as possible, and is as simple as possible to produce and install.

These objects are achieved in accordance with a preferred embodiment of this invention by the guide element of a louvered roof of the initially mentioned type being attached securely to the roof, and by the fixed adjustment path of the end cover strip being made such that this strip can be automatically displaced by an adjustment movement of it relative to the guide element between the closed position and a swung-out position.

The roof-fixed arrangement of the guide element and the special design of the guideway eliminate need for the strip which forms the end cover strip to have a separate lifting function. In particular, a linkage for transmission of the drive movement to the guide element and the entire movement mechanism for the guide element can be eliminated. On the one hand, this greatly reduces the number of mechanical components, i.e., production and installation cost, and on the other hand, increases the operating reliability of the opening and closing function of the louvered roof.

In accordance with another advantageous feature of the invention, it is provided that the end cover strip is joined so as to be adjustable relative to the guide element fixed on the roof by the fact that an engagement part which is joined to the guide element, for example, a guide shoe, engages a crank slot which is formed in the attachment element of the end cover strip, the steepness of the crank slot in the attachment element of the end cover strip raising the rear end relative to the plane of the roof. This configuration allows an especially simple execution of the corresponding attachment element.

One additional or alternative feature of the invention is that each attachment element has an adjustment element and a carrier element, the strip being attached to the carrier element, and the adjustment element and the carrier elements each being joined to one another on their rear end at a hinge point so as to be able to rotate around an axis which lies transversely to the displacement direction, the hinge point being located between the adjustment element and the carrier element for an end cover strip at a point which is farther forward on the carrier element than for the other strips. This arrangement intensifies the swinging-out motion of the rear edge of the strip which forms the companion; this provides for increased operating reliability.

These and further objects, features and advantages of the invention will become apparent from the following description together with the accompanying drawings which show an embodiment in accordance with the present invention.

DETAILED DESCRIPTION OF THE PREFERRED EMBODIMENT

Hereafter, the directions "front, forward" or "preceding" means in a direction away from the first fully swung-out strip; "back, rear" or "following" means in a direction toward the strip which is fully swung out first; "inside" or "inner" means in a direction which is transversely toward the longitudinal center line of the roof opening, and "outside or outer" means transversely directed away from the longitudinal center line of the roof opening; and "up" and "down" are used in their conventional sense with respect to directs away from and towards the ground.

Furthermore, in the illustrated embodiment, "front" or "preceding" are used with reference to a normal forward direction of vehicle travel and "back" or "following" means opposite the normal forward direction of vehicle travel. An "opening movement" is a displacement of roof cover strips along a guide which is fixed to the vehicle roof.

Figure 1:
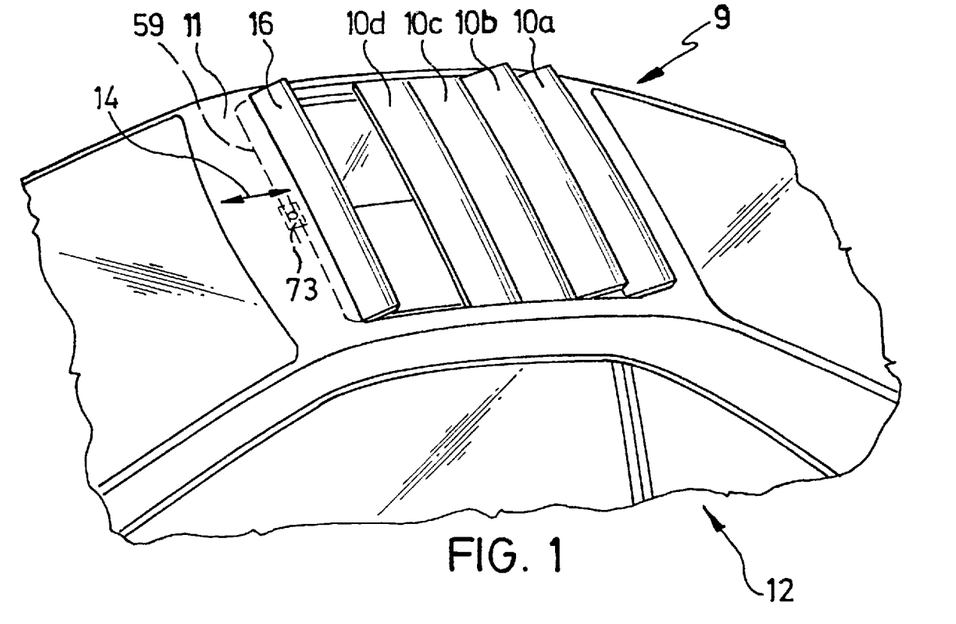
FIG. 1 shows a perspective schematic view of a louvered roof in a partially opened state.

Vehicle roof 9, here a louvered roof, as follows from the schematic illustrations of FIGS. 1 and 2, has a series of sliding cover strips 10a through 10d. These strips are used for selectively closing and at least partial exposing of a roof opening 13 which is formed in the fixed roof surface 11 of motor vehicle 12. To open and close roof 9, the strips 10a through 10d are displaceable, in the embodiment shown, in the directions represented by the double arrow 14, running parallel to the longitudinal axis of the vehicle 12 and the roof opening 13. However, fundamentally, other displacement directions are possible; for example, transversely to the longitudinal axis of the vehicle. In their closed position, cover strips 10a through 10d tightly adjoin one another at their longitudinal edges which run transversely with respect to the displacement directions 14, with sealing elements being located there. In doing so, they form a cover for the roof opening in the form of an essentially planar integrated system of strips, as is shown in FIG. 1 for the two strips 10c and 10b, which is parallel to the fixed roof surface 11; by "essentially" planar it is intended to encompass the use of strips which are slightly bowed to match the slight transverse curvature common to many vehicle roofs. Strips 10a through 10d can, furthermore, each be swung around a (virtual) pivot axis which extends transversely with respect to displacement directions 14 and which lies roughly at the height of the fixed roof surface 11 in the illustrated embodiment.

A movement mechanism, as explained in detail below, coordinates the displacement and swinging movements of the individual strips 10a through 10d, such the planar integrated strip system executes a rearward translational movement in displacement direction 14 as the sliding strips are displaced and this system is broken up in a strip-by-strip manner at the rear end thereof when roof 9 is opened by moving one strip at a time out of the system, or is re-established when the roof is closed. In the course of opening roof 9, which was closed beforehand, first of all, strip 10a is swung into a slanted position in which the rear edge 82 detaches itself from the rear edge 15 of roof opening 13 (compare, FIGS. 5 & 6). Then, a rearward displacement force can be applied to the integrated strip system in order to displace the rearmost strip 10a, proceeding from the noted slanted position, together with the other strips 10b through 10d which remain in the flat integrated strip system, i.e.. which are not swung out. In doing so, the strip 10a continues to swing into its raised end position (shown in FIG. 7). After the strip 10a has reached its end position (also illustrated in FIGS. 1 & 2), the next strip 10b is raised. This cycle is repeated until, as shown in FIG. 2, all of the sliding strips 10a through 10c have been raised and pushed backward into their open position.

Figure 2:
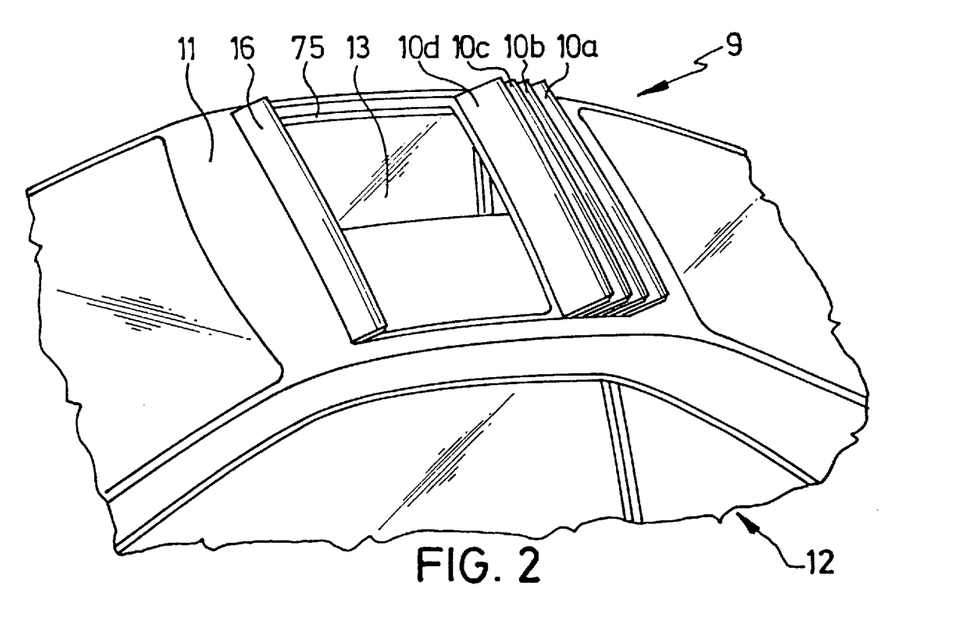
FIG. 2 shows a view corresponding to FIG. 1 with the roof fully opened.

When roof 9 is closed, proceeding from the fully open position of FIG. 2, first of all, only the forwardmost strip 10d is moved forward and swung back into a position parallel to the fixed vehicle roof 11. A corresponding sequence of movements is induced in succession for each of the following strips 10c, 10b, and 10a until the strips re-form the flat integrated system in their front end position, thereby closing the roof opening 13.

In the illustrated embodiment, in the area of the front end of the roof opening 13, sits a raisable, strip-shaped wind deflector 16 which is swung into a position which rises obliquely toward the rear, around a pivot axis which runs transversely relative to the longitudinal axis of the vehicle, when the opening process is initiated. In doing so, the roof assumes a ventilation position which can be used even in the rain with the strips in the closed position. When the Wind deflector 16 is in its closed position, its rear edge is placed tightly against the front edge of sliding strip 10d, which is in the front end position in the closed position of the roof 9. In doing so, the wind deflector 16 closes the frontmost part of the roof opening 13. Optionally, the design can also be executed such that the planar integrated system of strips 10a through 10d, in the closed position, extends from the front edge to the rear edge of roof opening 13, and thus, assumes the closing function by itself. In doing so, optionally, in the manner conventional for sliding roofs, a wind deflector can be provided of the type which disappears under the fixed roof surface when the roof closed and which automatically moves into the working position when the roof is opened.

FIGS. 1 and 2 show a vehicle roof with four sliding cover strips 10a through 10d. However, it goes without saying that essentially any number of sliding cover strips can be provided, depending on the given circumstances.

Strips 10b through 10d are made identically, while the arrangement or shaping of certain expressly specified parts for rearmost strip 10a deviates from that of the other strips 10b through 10d. Parts or components which are made differently in rearmost strip 10a are hereafter labelled with an "a" following the general reference number.

Figure 10:
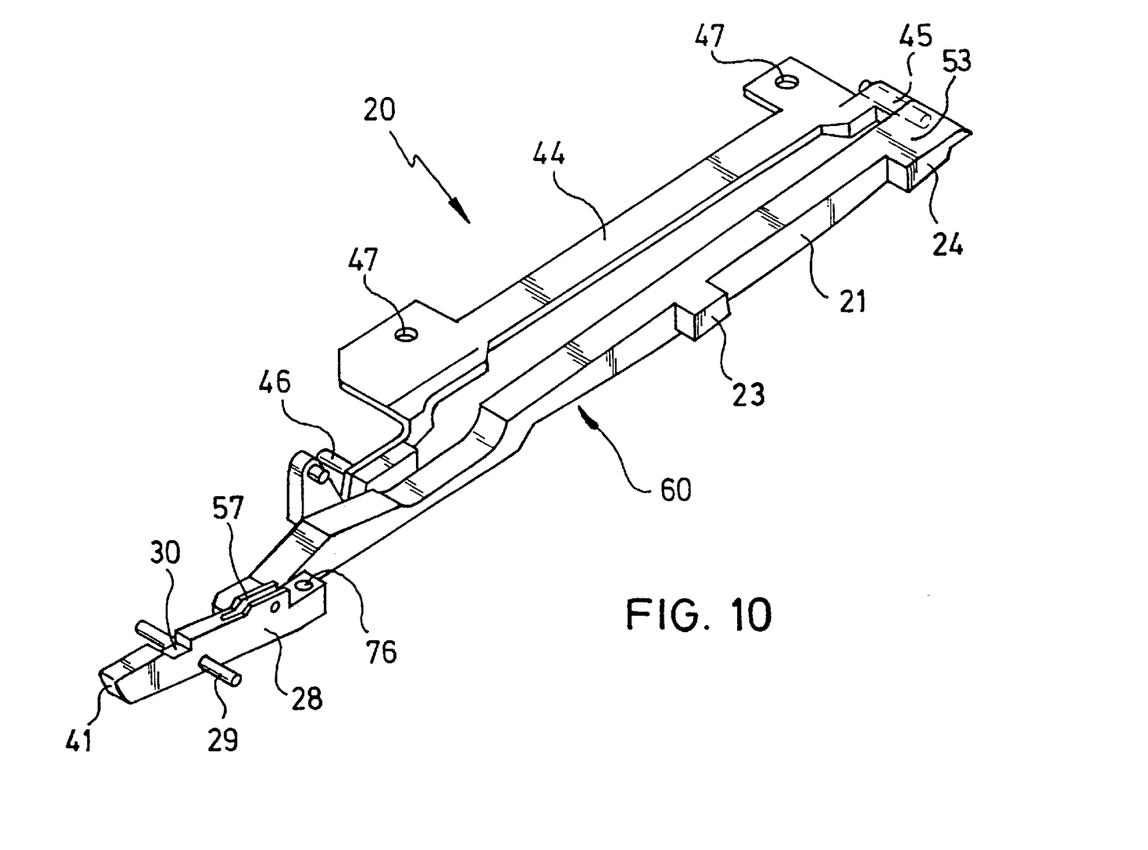
FIG. 10 is an overhead perspective view of a left side attachment element with a strip carrier element connected to it.

Each of the cover strips 10b through 10d has a strip blade 8b through 8d which is joined on each its two narrow ends to a respective attachment element 20b through 20d. Each of the attachment elements 20 includes a displacement element 60 at its outer side and carrier element 44 at its inner side (see especially FIG. 10). Displacement elements 60 each have a rear part 21 and a front part 28.

Figures 3, 4:
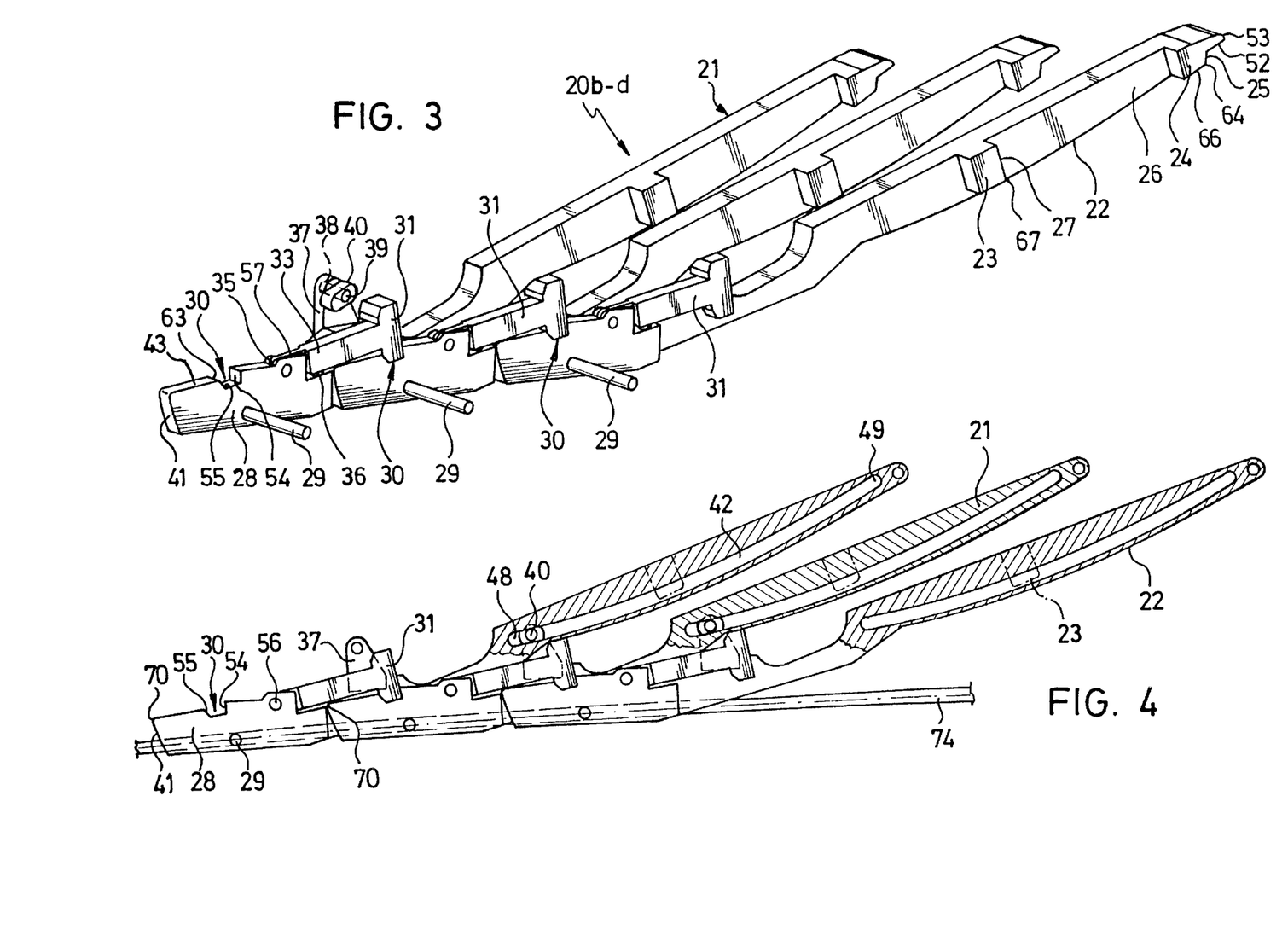
FIG. 3 shows a perspective schematic view of a side of three attachment elements for the left side (viewed in a forward direction of travel) of a louvered roof according to the opened state of FIG. 2.
FIG. 4 is a cross-sectional side view of the attachment elements of FIG. 3.

The rear end 53 of the rear part 21 is formed by a driver 24 which projects laterally outward and has a bearing surface 25 which points rearwardly downward, as well as two other bearing surfaces 52 and 66 which point downward (FIG. 3). The edge between bearing surfaces 25 and 66 is labelled 64. The bottom 22 of rear part 21 is formed by a surface which is slightly curved in the displacement directions 14. A guide recess 26 is formed between the front side of the driver 24 and a bearing surface 27 of a second driver 23. In the rear area, at the inside of rear part 21 of displacement element 60, a curved crank slot 42 is formed which runs roughly parallel to the curvature of bottom 22.

Carrier element 44, which is provided with attachment openings 47 for attachment of a cover strip, and is joined to the rear end 53 of displacement element 60 so as to be able to pivot on a pivot bearing 45 around an axis which is oriented transversely to the displacement directions 14. The front section of carrier element 44 has a guide pin 46 which fits into a guideway 74 of the guide rail 75 which runs parallel to the displacement directions 14 and which is fixed on the underside of roof 11.

Roughly in the center of rear part 21 of displacement element 60, laterally to the outside, driver 23 is formed with a rearward facing bearing surface 27 which is bounded by a lower edge 67 and which is slightly curved to the front. Farther forward, displacement element 60 has an upwardly extending arm 37 which is provided with a hole 38 (FIG. 3). The pin 39 which is inserted into this hole 38 carries a guide shoe 40. In this way, guide shoe 40 is joined to the arm 37 to pivot on the outside of the arm 37 around an axis which is oriented transversely to displacement directions 14. The guide shoe 40 engages a crank slot 42 of a preceding attachment element 20, such that it can be displaced along its crank slot 42, and thus, guide shoe 40 can also be considered to be an engagement part.

Figure 9A:
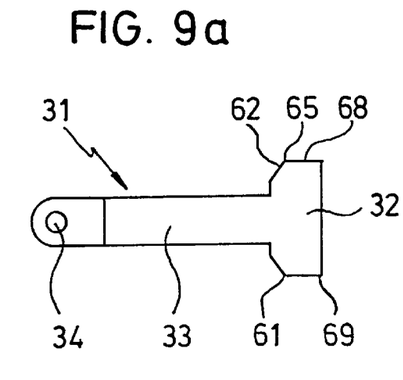
FIGS. 9a through 9c are inner side, free end, and outer side elevational views, respectively, of a lock bar.
Figure 9B:
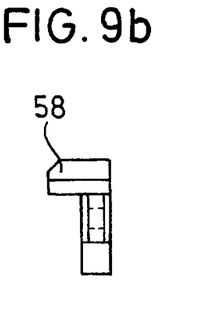
Figure 9C:
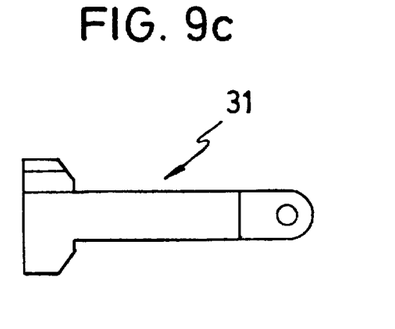

The front end of front part 28 is formed by a front surface 41 with top edge 70 (FIG. 4). On the top of front part 28, following a bearing surface 43 which is bordered by an edge 63 to the rear, is a rear lock bar recess 30 which has a rear surface 54 which is roughly perpendicular to the plane of the roof and a front surface 55 which rises obliquely forwardly up toward edge 63. In addition, in this area, displacement element 60 has a guide pin 29 which fits into the guideway 74 of the guide rail 75 fixed to the roof. In a slot 57, which is located farther to the rear on the top of front part 28, a locking element in the form of a hammer-shaped locking bar 31 is mounted on a pivot bearing element 35. The pivot bearing element 35 fits in a hole 56 in the front part 28 and in a hole 34 in the front part of shaft 33 of the locking bar 31 (FIG. 9a), the pivot axis being oriented transversely with respect to the displacement directions 14. In a hole 76 (FIG. 10) on the rear end of front part 28 sits a spring 36 which upwardly prestresses the locking bar 31.

The rounded front end of the lock bar shaft 33, i.e., the end which is thinner, fits into slot 57. Otherwise, shaft 33 is essentially flush with the front part 28 of displacement element 60 in the transverse direction. In its rear section, the locking bar 31 has a head 32 which is thickened in the manner of a hammer. The edges of head 32 which face forward are bevelled at a roughly 45° angle. The upper slanted surface is labelled 62; its rear boundary edge is labelled 65 and the corresponding edge of the bottom slanted surface is labelled 61. The rear lower edge of head 32 is labelled 69. In its upper section, the head 32 has a projection 58 which points inward.

Front part 28 is outwardly offset parallel to the rear part 21 of the displacement element 60. The outer surface of the drivers 23 and 24 are roughly flush with the outer surface of front part 28.

Figure 8:
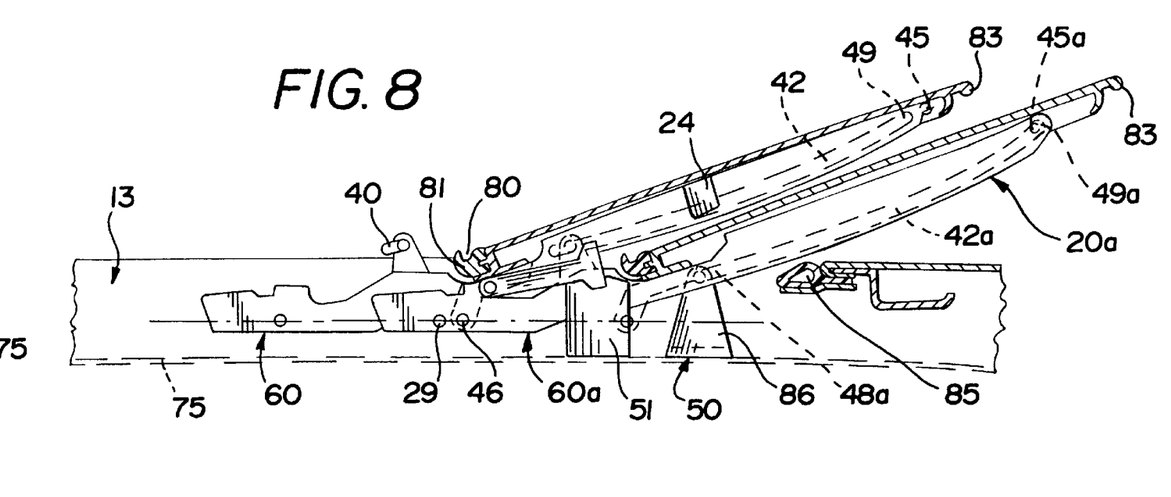

Each strip blade 8b through 8d, at its front edge, carries a penetration seal 81 (FIG. 8). On rear edge 82 of each strip blade 8b through 8d, a sealing lip 83 is formed. In the closed state of the roof (FIG. 5), the sealing lip 83 of the preceding cover strip 10 fits tightly into a receiver 80 of the penetration seal 81 of the following cover strip 10.

The strip blade 8a of the rearmost strip, including the sealing elements 81, 83, is made identically to the other strip blades 8b through 8d. The sealing lip 83 of rearmost strip 10a, however, does not fit into the corresponding receiver of a penetration seal; instead, in the closed position of the roof (FIG. 5), it tightly abuts a hollow body edge seal element 85 which is attached to the rear edge 15 of the roof opening 13, the seal which is formed in this way not being made as a penetration seal. All these sealing elements are made, preferably, of a suitably elastic material, for example, rubber.

Figure 7:
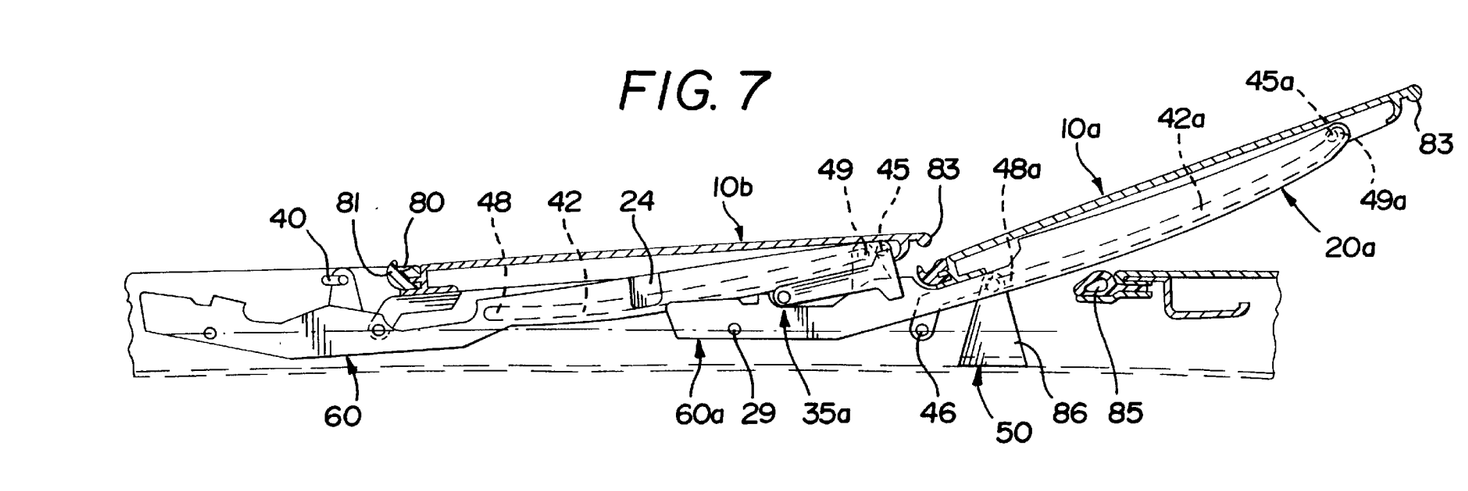

The hinge point formed between displacement element 60a and carrier element 44a by pivot bearing 45a is offset on carrier element 44a by a certain distance toward the front, i.e., in the direction to the front edge of strip plate 8a, relative to the position of pivot bearing 45 of the other strips 10b through 10d, as is apparent from FIGS. 7 & 8. Otherwise, carrier element 44a is made analogously to carrier element 44 of the other strips 10b through 10d. The arrangement of the hinge point formed by bearing 45a with respect to displacement element 60a is similar to the corresponding arrangement in the other strips.

Figure 5:
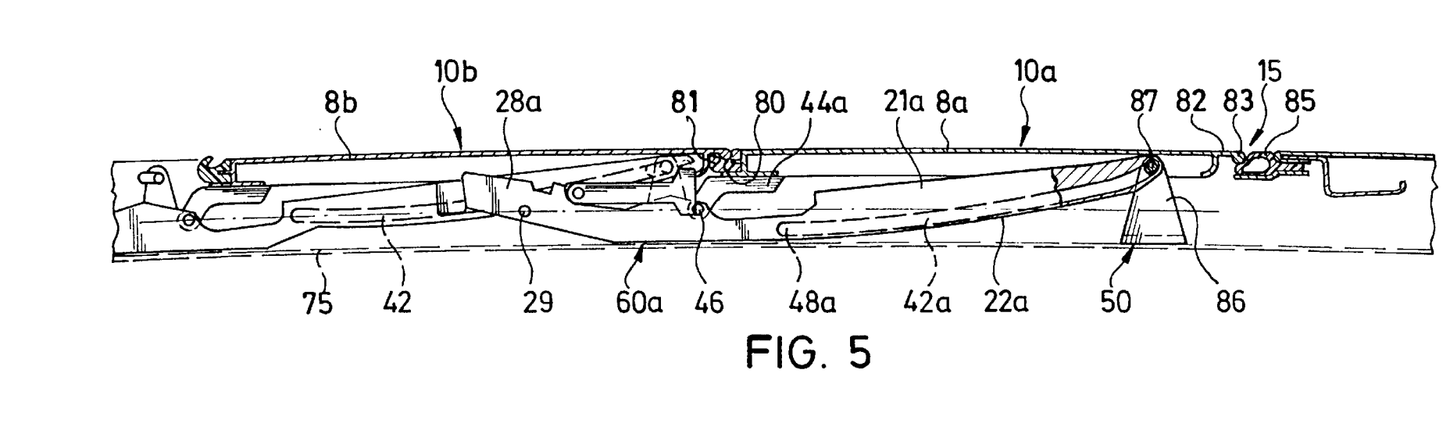
FIGS. 5, 6, 7 and 8 each show a partially broken away side elevational view of the two rearmost attachment elements for the left side of the louvered roof, respectively, in their closed state (FIG. 5), during in initial raising of the single rearmost attachment element (FIG. 6), with the single rearmost attachment element fully opened (FIG. 7), and with the two rearmost attachment elements fully opened (FIG. 8)

According to the forward offset of the hinge point between the displacement element 60a and the carrier element 44a, the total length of displacement element 60a is reduced by roughly this amount, this shortening being made essentially in front part 28a. The distance between guide pin 29 of displacement element 60a and the hinge point formed by pivot bearing 45a is somewhat smaller than for the other strips. The crank slot 42a has roughly the same path length as in the other strips; however, its front end 48a, in the closed position, is essentially lower than in the other strips, while its rear end 49a lies at roughly the same height as in the other strips (FIG. 5). Therefore, the average pitch of the path of the crank slot 42a is greater than in the other strips. The front end 48a of the crank slot 42a is a shorter distance from guide pins 29 or 46 of displacement element 60a or carrier element 44a than is the case for the other strips, these pins acting as pivot points. Furthermore, while the curvature of crank slot 42 for the other strips is roughly constant over its entire length, the curvature of crank slot 42a increases from the front end 48a to the rear end 49a. This increase is especially pronounced on roughly the last tenth of the crank path, so that the average pitch there is greater than on the corresponding path section of the other strips. For example, the slope of the crank slot, in the closed position of the roof, is at least roughly 30° degrees relative to the plane of the roof in the vicinity of the rear end 49a of the crank slot 42a. Here also, the bottom 22a of the rear part 21a of the displacement element 60a of rearmost strip 10a is lower than for the other strips.

Figure 6:
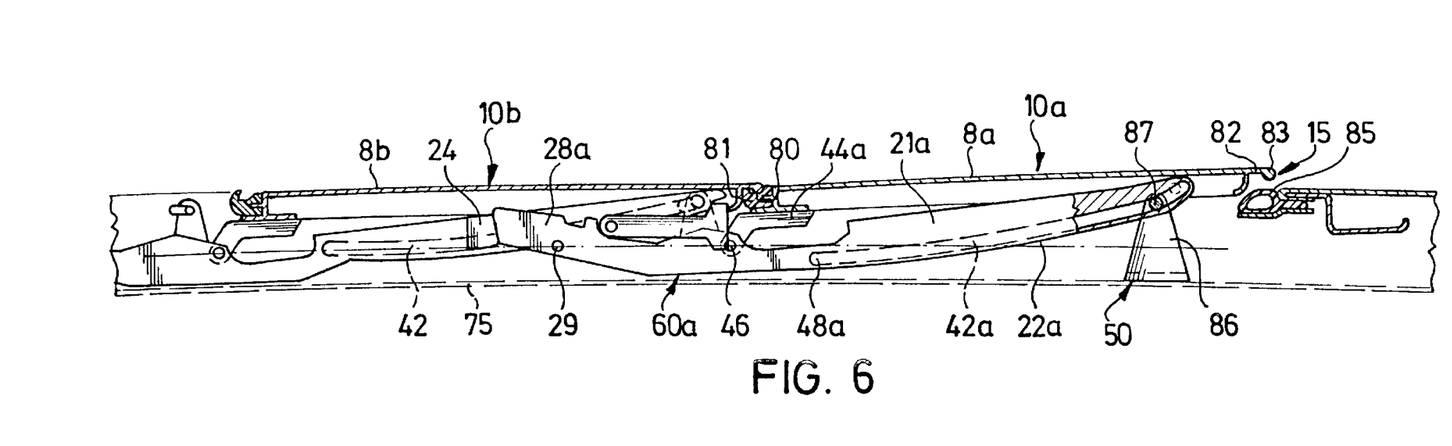
Figure 8A:
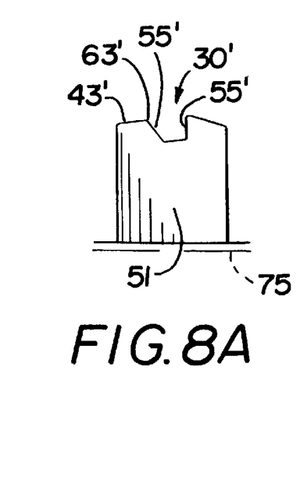
FIG. 8A is side view of a stationary counterpiece.

In the area of the rear end of the guide rail 75, there is a counterpiece 51 which is fixed to the roof (this stationary counterpiece being shown in FIG. 8, but has been omitted from FIGS. 5–7 for clarity so as to show parts which would otherwise be covered by counterpiece 51). The stationary counterpiece 51 corresponds in its shape to the portion of the front half of the front part 28 which the contains recess 30 for holding of head 32 of the locking bar 31, as can be seen from a comparison of the recess 30', edge 63' and surfaces 43', 55' and 54' (FIG. 8A) with the like number features of front part 28 (FIG. 3). Guide element 50, which essentially has an arm 86 and a guide shoe 87 (in the manner of arm 37 and guide shoe 40 of the attachment element 20) is attached securely to the roof, guide shoe 87 fitting into crank slot 42a of rearmost strip 10a.

Drive cables 59, schematically depicted in FIG. 1, made preferably as a threaded cables, are drive-connected to the front part 28 of the displacement elements 60 of the front-most strip 10d at each side of the roof. Drive cables 59 extend to a drive unit 73 which is shown only in outline in FIG. 1. Drive unit 73 can, in a conventional manner, have an electric motor and a reducing gear, a pinion which is joined to the output of the reducing gear and which engages the drive cables 59. However, a manually operated unit, especially in the form of a hand crank, can also be provided as the drive unit.

The described louvered roof operates as follows.

In the closed position of the roof shown in FIG. 5, adjacent strips 10 or attachment elements 20 are coupled to one another. For displacement in the opening direction (to the rear), front surface 41 of an attachment element (for example 20c) bears against surface 27 of the driver 23 of the preceding attachment element (for example, 20d). Coupling in the closing direction (displacement to the front) takes place by guide shoe 40 of an attachment element (for example 20c) bearing against the rear end 49 of the crank slot 42 of the preceding attachment element (for example 20d). The individual strips are thus protected against unintentionally shifting. Because each of the attachment elements 20a through 20d is guided on its front part 28 at two sites by means of guide pins 29 and 46 in the guide rail 75, and furthermore, the rear end 49 of the crank slot 42 engages the guide shoe 40 of the following attachment element or guide element 50 which is fixed to the roof, each individual strip is also protected against unintentionally pivoting. Lock bars 31 are each prestressed upward via springs 36, so that the top of each head 32 abuts the bearing surface 25 of the driver 24 of the preceding attachment element. Carrier elements 44, and thus strip blades 8, all abut one another tightly parallel to the roof plane. Guide shoe 87 of the guide element 50 which is fixed to the roof lies on the rear end 49a of the crank slot 42a of rearmost strip 10a. Adjacent attachment elements are arranged such that the outside of the end section of the rear part 21 of an attachment element (for example, 20c), the section extending rearwards from driver 23, abuts the inside of the front part 28 of the following attachment element (for example 20b). In this way, reliable guidance of attachment element 20 in the displacement direction is ensured.

To open the roof, force is transferred from drive unit 73 via the drive cables 59 to both sides of roof opening 13 in a rearward direction. First, the drive motion of drive cables 59, in the manner known, for example, from the above-mentioned German Patent 43 29 580 and corresponding U.S. patent application Ser. No. 08/299,090, causes the wind deflector 16 to swing out. Then, force is introduced by drive cable 59 on frontmost attachment element 20d. The force is transmitted each time by driver 23 to front surface 41 of the respective following attachment element, by which all strips 10a through 10d move jointly to the rear.

Guide shoe 87 of the guide element 50 which is fixed to the roof is guided to slide in crank slot 42a of the last attachment element 20a. Due to the relatively steep path in the rear section of crank slot 42a, displacement of the displacement element 60a, first, causes a pronounced lifting motion of the rear end of displacement element 60a which is superimposed on the displacement motion of the strip blade 8a to the rear, and by means of the connection of carrier element 44a via pivot bearing 45a, on the rear edge 82 of the strip blade 8a and on the sealing lip 83. The lifting motion is intensified by the fact that the point of application of the lifting motion on carrier element 44a is offset toward the front, so that lever reinforcement occurs. The lifting motion on the rear end of carrier element 44a causes pivoting of carrier element 44a around a horizontal pivot axis which is formed by guide pin 46 of the carrier element. Displacement element 60a is swung accordingly around an axis which is formed by the guide pin 29 of displacement element 60a.

The aforementioned lever action and the steep execution of the path of crank slot 42a, together, provide for sealing lip 83 and rear edge 82 of the strip blade 8a being swung upwardly quickly enough relative to the rearward displacement motion to preclude jamming of sealing lip 83 or rear edge 82 on the bearing element 85 or on rear roof edge 15 (see the position shown in FIG. 6).

Swinging out of the last attachment element 20a, furthermore, raises the lower edge of respective driver 23 above the upper edge of the stationary counterpiece 51.

Further displacement of attachment element 20a to the rear relative to guide shoe 87 of guide element 50 causes, in addition to the displacement, a further raising motion of last strip 10a. In doing so, the driver 23 moves over the stationary counterpiece 51. The raising motion of displacement element 60a and carrier element 44a takes place differently, since guide pins 29 and 46, which act as pivots, are at a distance from one another in displacement direction 14. To equalize the different rotation, two elements 44a, 60a on their rear end are joined to one another to rotate via pivot bearing 45a, so that rotary motion of displacement element 60a takes place relative to carrier element 44a. Since front surface 41 of the displacement element 60a is located in front of guide pin 29, i.e., the pivot of the raising motion of the displacement element 60a, raising the rear end of the displacement element 60a causes a lowering of the front surface 41 relative to the driver 23 of the preceding attachment element 20b. Arm 37, and thus guide shoe 40 of displacement element 60a, are located behind guide pin 29, so that guide shoe 40 and also the rear end of preceding attachment element 20b are likewise slightly lifted. The corresponding selection of the rotary lever or positions of the pivots (guide pins) causes the rear edge of the next-to-last strip 10b to be raised by swinging out of following (last) strip 10a over the front edge of last strip 10a. Sealing lip 83 of the next-to-last strip 10b, in doing so, gradually detaches from the receiver 80 of the last strip. This process is completed when last strip 10a is completely swung out (see FIG. 7) so that the successive strips can be pushed over one another as soon as the coupling between the two elements is released.

Attachment elements 20a through 20d are coupled such that the swinging out motion of the last attachment element 20a causes a swinging motion of the preceding attachment elements 20b through 20d in a way that lessens dramatically and advances to the front (see FIG. 7). Due to the prestress via spring 36, head 32 tracks each relative motion between adjacent attachment elements 20, so that it always engages the bearing surface 25 of driver 24. In particular, during the opening motion head 32 moves upward, displacement elements 60 and locking bar 31 being formed such that the lower edge of the head 32 of the next-to-last attachment element 20b has already been raised above the top edge of stationary counterpiece 51 when the latter is reached. The dimensions are such that the rear lower edge 61 of the head 32 sits on the bearing surface 43' of the stationary counterpiece 51, thereby guiding head 32 along the surface 43'. Roughly at this time, the top edge of front surface 41 of last attachment element 20a has been lowered below the lower edge 67 of the bearing surface 27 of the driver 23 of next-to-last attachment element 20b, so that the coupling of last two attachment elements 20a, 20b is released at this point. On the other hand, last two attachment elements 20a, 20b, however, are now coupled to one another in the opening direction via the head 32 of the last attachment element 20a. Upper bearing surface 62 of head 32 engages the bearing surface 25 of the driver 24 of next-to-last attachment element 20b. In spite of the corresponding bevels of the respective bearing surfaces, there is a frictional connection, since the lower edge 61 of the head 32 rests on bearing surface 43' of stationary counterpiece 51 and therefore cannot move away downward. The opening motion is consequently transmitted, as before, to the last attachment element 20a.

When lower edge 61 of head 32 reaches the rear edge 63' of the surface 43', head 32 is pressed down against the resistance of spring 36 into lock bar recess 30' of stationary counterpiece 51 (see FIG. 8), by the fact that slanted surface 62 of head 32 of last attachment element 20a and bevelled bearing surface 25 of driver 24 of the next-to-last attachment element 20b can slide relative to one another. Subsequently, surfaces 68 and 66 slide relative to one another. This process releases the coupling in the opening direction between the last and the next-to-last attachment element 20a, 20b, next-to-last attachment element 20b being displaced relative to last attachment element 20a, and at this point, being further swung out by the sliding of guide shoe 40 of last attachment element 20a in the crank slot 42 of next-to-last attachment element 20b. The head 32 of the locking bar 31 is held against the force of spring 36 in the lock bar recess 30 by the top of projection 58 of head 32 abutting the bottom 22 of the rear part 21 of next-to-last displacement element 60b. Projection 58 is guided in the region of guide recess 26 of bottom 22 at least over part of the path on bottom 22. The fact that the lower part of head 32 of last attachment element 20a rests in lock bar recess 30' of the stationary counterpiece 51 causes locking of last attachment element 20a, and thus, the last strip 10a to stationary counterpiece 51, in the opening and closing directions.

The continuing opening process takes place analogously to the manner already described, instead of the last attachment element 20a, the next-to-last attachment element 20b being swung out by displacement relative to the guide shoe 40 of the last attachment element 20a. The function of guide element 50 fixed to the roof and of the stationary counterpiece 51 fixed to the roof is consequently assumed by the guide shoe 40 or front part 28 of last attachment element 20a which is now locked securely on the roof.

FIG. 8 shows cover strips 10a and 10b in their fully swung out position. Additional locking of last strip 10a in the opening direction takes place by guide shoe 40 of last attachment element 20a abutting front end point 48 of crank slot 42 of last attachment element 20b in this position. Last strip 10a is thus secured against moving forward and rearward.

Preferably, in the fully swung out position, the last strip 10a is essentially parallel to the preceding strip 10b in its fully swung out position. Guide shoe 87 of guide element 50, i.e., the engagement point to crank slot 42a, during the entire opening movement remains in a constant position, while guide shoe 40 of strips 10b and 10c, i.e., the engagement point to the crank slot of the strip which is the preceding one at the time, is raised due to the swinging out motion of the displacement element during the opening process (see the position of guide shoe 40 of strip 10b in FIG. 8). In spite of this height difference, a parallel position of strip blades 8a and 8b is provided by the fact that, on the one hand, for last strip 10a, the distance of front end 48a of crank slot 42a from guide pins 29 or 46 is less than for the other strips, and on the other hand, for last strip 10a, front end 48a of crank slot 42a is lower with reference to guide pins 29 or 46 than for the other strips.

The presence of the lower part of the head 32 of the next-to-last attachment element 20b in the lock bar recess 30 of the last attachment element 20a, which is caused by the opening motion and thus the decoupling of the third-to-last attachment element 20c, causes locking of last attachment element 20a (which is locked securely on the roof) to the next-to-last attachment element 20b which is, thus for its part, locked securely to the roof. The decoupling of the force of the two attachment elements (for example 20b, 20c) during the opening motion, therefore, causes attachment element 20c (which is the preceding one at the time) to be securely locked for its part by head 32 pressing down into lock bar recess 30, the attachment element 20b which is the following one at the time, with the subsequent attachment element 20a, which is already locked securely to the roof.

The opening process can now be continued in a similar manner until frontmost attachment element 20d is also fully swung out and the roof opening is thus exposed to the maximum degree. With the exception of frontmost strip 10d, all strips are now locked to one another on opposite sides of the roof in the fully swung-out position (see FIGS. 3, 4 and 8). Frontmost strip 10d is locked in its position by the drive being made rigid and self-locking in the conventional manner via drive cables 59.

When a closing motion is initiated, force is transmitted in a forward direction by drive unit 73 to drive cables 59 on both sides of the roof opening 13 which act on first strip 10d. Unlocked first strip 10d thus moves to the front. Guide shoe 40 of second attachment element 20c slides in crank slot 42 of first attachment element 20d. The first attachment element 20d is in part swung down again by the closing motion to the front. Motion of second attachment element 20c in the closing direction cannot take place, since its head 32 is kept engaged to lock bar recess 30 of third attachment element 20b via the bearing on bottom 22 of first attachment element 20d. As soon as edge 64 of bearing surface 25 of the driver 24 of first attachment element 20d has moved forward over boundary edge 65 of slanted surface 62 of head 32 of second attachment element 20c, head 32 slides off of the top on bevelled bearing surface 25 of driver 24 and disengages from lock bar recess 30 of third attachment element 20b, due to the reset force of spring 36 which acts upward. The locking of second attachment element 20c to third attachment element 20b is released. At the same time, guide shoe 40 of second attachment element 20c reaches rear end 49 of the crank slot 42 in the first attachment element 20d, so that the coupling between the first attachment element 20d and second attachment element 20c is produced in the closing direction. Furthermore, second attachment element 20c is moved forward, at the same time, by the first attachment element 20d. Roughly at the time at which rear lower edge 69 of head 32 of second attachment element 20c has been moved forward over the upper edge 70 of front surface 41 of third attachment element 20b, upper edge 70 of front surface 41 of second attachment element 20c is moved over lower edge 67 of driver 23 of first attachment element 20d due to the lifting of the front end of front part 28 of element 20c, which results from the increasing lowering of rear part 21 of second attachment element 20c and the associated rotation around guide pin 29. In the opening direction, coupling between the first and second attachment elements 20d, 20c is again established by the contact of corresponding surfaces 41 and 27 and would again be effective, for example, when the drive direction is reversed.

The further closing process for the other attachment elements or strips takes place similarly, ultimately by the closing motion of next-to-last attachment element 20b releasing the locking of last attachment element 20a to stationary counterpiece 51. In the course of the closing motion, starting from the front, sealing lips 83 dip in succession into corresponding receivers 80, so that, again, a sealed, integrated system of strips is produced. When guide shoe 87 of guide element 50, which is fixed to the roof, the guide shoe fitting into last attachment element 20a, reaches the rear end 49a of the crank slot 42a, all strips 10a through 10d are again in one plane parallel to the plane of the roof. Therefore, the closing process takes place such that some of the strips are always coupled to one another and move jointly in the closing direction, while the remainder of the strips are locked to one another and securely to the roof, so that they cannot take part in the closing motion. The last movable and the first locked strips are thus decoupled from one another.

In the described embodiment, sufficient intensification of the swinging-out motion of sealing lip 83 of last strip 10a is achieved both by the crank slot 42a in the vicinity of its rear end 49a being made steeper and also by the hinge point or bearing 35a being forwardly offset between carrier element 44a and displacement element 60a with respect to carrier element 44a. But, it is not essential that the two measures be provided jointly. Optionally, each of these measures can provide, by itself, for the required stronger initial swinging-out motion of last strip 42a with the appropriate dimensioning. In general, the desired effect can also be achieved by other structural measures in the alternate side arrangement of function points (in the described embodiment they are guide pins 29, 46, pivot bearing 35, and guide shoe 87) and the adjustment path (in the example, crank slot 42a) of the last strip.

It is assumed above that the strips are pushed together when opening on the rear end of the roof opening. Basically, this pushing together can also take place on the front end of the roof opening.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Vehicle roof with a series of elongated cover strips for selectively closing and at least partial exposing a roof opening in a fixed roof surface of a vehicle, the cover strips bordering one another in a closed position in a manner forming an essentially planar, integrated system of cover strips, each cover strip having a swingable attachment element on each of opposite narrow ends thereof, means for guiding each of the attachment elements along a guideway attached to the roof, means for coupling adjacent attachment elements for joint movement in opening and closing directions as long as neither of the adjacent attachment elements is in a fully swung-out position, and means for disengaging said coupling means as each of the adjacent attachment elements reaches a fully swung-out position in a manner enabling relative movement with respect to one another as a respective, not yet fully swung-out, one of the adjacent attachment elements is being swung out, a locking element being provided for locking each attachment element in a fully swung-out position under the influence of an opening movement of the respective adjacent attachment element, means for automatically releasing each said locking element in response to a closing motion of the respective adjacent attachment element, and a guide element for moving an end cover strip along a fixed translational path with respect to the fixed roof surface; wherein said guide element is connected to the fixed roof surface and to the end cover strip in a manner enabling the end cover strip to be automatically displaceable relative to the guide element between the closed position and the fully swung-out position; wherein the end cover strip is connected to the guide element by an engagement part which is joined to the guide element and engages a crank slot which is formed in the attachment element for the end cover strip.

2. Vehicle roof according to claim 1, wherein the engagement part abuts one of a rear and a front end of the crank slot in one of the closed position and the fully swung-out position of end cover strip.

3. Vehicle roof according to claim 1, wherein the crank slot has a slope which increases relative to a plane of the fixed roof surface in a rearward direction.

4. Vehicle roof according to claim 3, wherein the slope of the crank slot, in the closed position of the roof, is at least roughly 30° degrees relative to the plane of the roof in the vicinity of a rear end of the crank slot.

5. Vehicle roof according to claim 3, wherein the attachment element for each of the cover strips has a crank slot formed therein; wherein an average pitch of the crank slot in the attachment element of the end cover strip is greater than an average pitch of the crank slot of the attachment elements for the other cover strips.

6. Vehicle roof according to claim 5, wherein each attachment element has a displacement element and a carrier element; wherein each cover strip comprises a strip blade attached to each carrier element; and wherein the displacement element and the carrier element are joined to one another on rear end thereof at a pivot point which forms a rotational axis which runs transversely to a displacement direction of the cover strip.

7. Vehicle roof according to claim 6, wherein the pivot point is located between the displacement element and the carrier element and is located at a position that is farther forward on the carrier element of the end cover strip than on the carrier element for the other cover strips.

8. Vehicle roof according to claim 7, wherein a longitudinal dimension of the displacement element of the end cover strip is less than a longitudinal dimension of the displacement elements of the other cover strips.

9. Vehicle roof according to claim 6, wherein each displacement element and each carrier element has a front part with a guide pin which is displaceable in said guideway.

10. Vehicle roof according to claim 9, wherein the guide pin of the displacement element of the end cover strip is located a shorter distance in the longitudinal direction from the pivot point between the respective displacement element and carrier element thereof than is the respective guide pin for the other cover strips relative to the respective displacement element and carrier element thereof.

11. Vehicle roof according to claim 10, wherein a front end of the crank slot of the end cover strip is located a shorter distance from the guide pins of the end cover strip than is the front end of the respective crank slot of the other cover strips relative to the respective guide pins of the other cover strips.

12. Vehicle roof according to claim 11, wherein the front end of the crank slot in the attachment element of the end cover strip is lower than the front end of the crank slots of the attachment elements of other cover strips in the closed position of the roof.

13. Vehicle roof according to claim 1, further comprising means for bring the cover strips into an essentially parallel relationship with respect to one another in the fully swung-out position.

14. Vehicle roof according claim 1, wherein the said end cover strip a rearmost cover strip is relative to a forward direction of travel.

15. Vehicle roof according to claim 1, wherein the locking element for locking the attachment element of the end cover strip engages a stationary counterpiece which is fixed to the roof under the influence of the opening movement of the adjacent attachment element; and wherein means are provided for automatically releasing said locking element from said stationary counterpiece in response to the closing motion of the adjacent attachment element.

16. Vehicle roof with a series of elongated cover strips for selectively closing and at least partial exposing a roof opening in a fixed roof surface of a vehicle, the cover strips bordering one another in a closed position in a manner forming an essentially planar, integrated system of cover strips, comprising:

a swingable attachment element on each of opposite narrow ends of each cover strip;

a guideway attached to the roof and along which the attachment elements are guided;

coupling means for coupling adjacent attachment elements for movement together in opening and closing directions except when one of the adjacent attachment elements is in a fully swung-out position, and means for disengaging said coupling means as each of the adjacent attachment elements has reached a fully swung-out position in a manner enabling relative movement with respect to one another until a respective, not yet fully swung-out, one of the adjacent attachment elements begins to swinging out;

a respective locking element for locking each attachment element in a fully swung-out position in response to an opening of the respective adjacent attachment element, means for automatically releasing each said locking element in response to a closing motion of the respective adjacent attachment element; and a stationary guide element for moving an end cover strip along a fixed translational path with respect to the fixed roof surface;

wherein said guide element is connected to the fixed roof surface and to the end cover strip in a manner enabling the end cover strip to be automatically displaceable relative to the guide element between the closed position and the fully swung-out position; and wherein the end cover strip is connected to the guide element by an engagement part which is joined to the guide element and engages an elongated slot in the attachment element for the end cover strip.

17. Vehicle roof according to claim 16, wherein the elongated slot has a slope which increases relative to a plane of the fixed roof surface in a rearward direction.

18. Vehicle roof according to claim 17, wherein the attachment element for each of the cover strips has an elongated slot formed therein; wherein an average pitch of the elongated slot in the attachment element of the end cover strip is greater than an average pitch of the elongated slot of the attachment elements for the other cover strips.

* * * * *